United States Patent
Xu

(10) Patent No.: US 7,385,636 B2
(45) Date of Patent: Jun. 10, 2008

(54) LOW NOISE SAMPLE AND HOLD CIRCUIT FOR IMAGE SENSORS

(75) Inventor: Weize Xu, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 762 days.

(21) Appl. No.: 10/836,884

(22) Filed: Apr. 30, 2004

(65) Prior Publication Data

US 2005/0243194 A1    Nov. 3, 2005

(51) Int. Cl.
*H04N 5/217* (2006.01)

(52) U.S. Cl. ...................... 348/241; 348/245

(58) Field of Classification Search ............... 348/246, 348/241, 243, 245; 250/214, 208.1
See application file for complete search history.

(56) References Cited

U.S. PATENT DOCUMENTS

| | | | | |
|---|---|---|---|---|
| 4,649,430 A * | 3/1987 | Hynecek | ...................... | 348/245 |
| 5,086,344 A | 2/1992 | D'Luna et al. | | |
| 5,144,444 A | 9/1992 | MacLean | | |
| 5,329,312 A | 7/1994 | Boisvert et al. | | |
| 5,467,130 A * | 11/1995 | Darden et al. | .............. | 348/241 |
| 5,892,540 A * | 4/1999 | Kozlowski et al. | ......... | 348/300 |
| 5,933,189 A * | 8/1999 | Nomura | ....................... | 348/302 |
| 5,955,753 A * | 9/1999 | Takahashi | .................... | 257/292 |
| 6,483,541 B1 * | 11/2002 | Yonemoto et al. | .......... | 348/302 |
| 6,597,868 B2 * | 7/2003 | Suda | ......................... | 396/111 |
| 6,674,470 B1 * | 1/2004 | Tanaka et al. | .............. | 348/302 |
| 6,720,999 B1 * | 4/2004 | Holberg et al. | ........... | 348/222.1 |
| 6,963,372 B1 * | 11/2005 | Hiyama et al. | ............. | 348/302 |
| 6,982,757 B2 * | 1/2006 | Tariki | ......................... | 348/243 |
| 7,046,284 B2 * | 5/2006 | Kozlowski et al. | .......... | 348/308 |
| 7,053,941 B1 * | 5/2006 | Ohashi | ...................... | 348/243 |
| 7,113,213 B2 * | 9/2006 | Matsunaga et al. | ......... | 348/308 |

FOREIGN PATENT DOCUMENTS

WO        99/07138        2/1999

* cited by examiner

*Primary Examiner*—Lin Ye
*Assistant Examiner*—Amy Hsu
(74) *Attorney, Agent, or Firm*—Peyton Watkins

(57) ABSTRACT

An image sensor includes a plurality of pixels for capturing incident light that is converted to a signal representing an image; wherein noise is combined with a signal representing both the image and a reset level; a plurality of dark reference pixels that generate noise that substantially correspond or equally correspond to the noise in the image and reset level; and a sample and hold circuit that reads out the image signal and cancels or substantially cancels out the noise from the image signal and reset level by canceling the noise from image and reset level with the noise generated from the dark reference pixels.

4 Claims, 2 Drawing Sheets

LOW NOISE SAMPLE AND HOLD CIRCUIT FOR IMAGE SENSORS

FIELD OF THE INVENTION

The invention relates generally to the field of image sensors and, more particularly, to a method and apparatus for eliminating the unwanted noise generated from image sensors.

BACKGROUND OF THE INVENTION

As is well known in the art, digital cameras include image sensors for capturing electronic representations of a scene. As with most electronic devices, unwanted noise is generated in image sensors that degrade the quality of the image. Obviously, it is desirable to eliminate this noise for improving image quality.

Consequently a need exists for a method and apparatus for eliminating this unwanted noise.

SUMMARY OF THE INVENTION

The present invention is directed to overcoming one or more of the problems set forth above. Briefly summarized, according to one aspect of the present invention, the invention resides in an image sensor comprising (a) a plurality of pixels for capturing incident light that is converted to a signal representing an image; wherein noise is combined with a signal representing both the image and a reset level; (b) a plurality of dark reference pixels that generate noise that substantially correspond or equally correspond to the noise in the image and reset level; and (c) a sample and hold circuit that reads out the image signal and cancels or substantially cancels out the noise from the image signal and reset level by canceling the noise from image and reset level with the noise generated from the dark reference pixels.

These and other aspects, objects, features and advantages of the present invention will be more clearly understood and appreciated from a review of the following detailed description of the preferred embodiments and appended claims, and by reference to the accompanying drawings.

ADVANTAGEOUS EFFECT OF THE INVENTION

The present invention has the advantage of canceling unwanted noise generated in the pixels of image sensors.

DETAILED DESCRIPTION OF THE INVENTION

Figure 1:
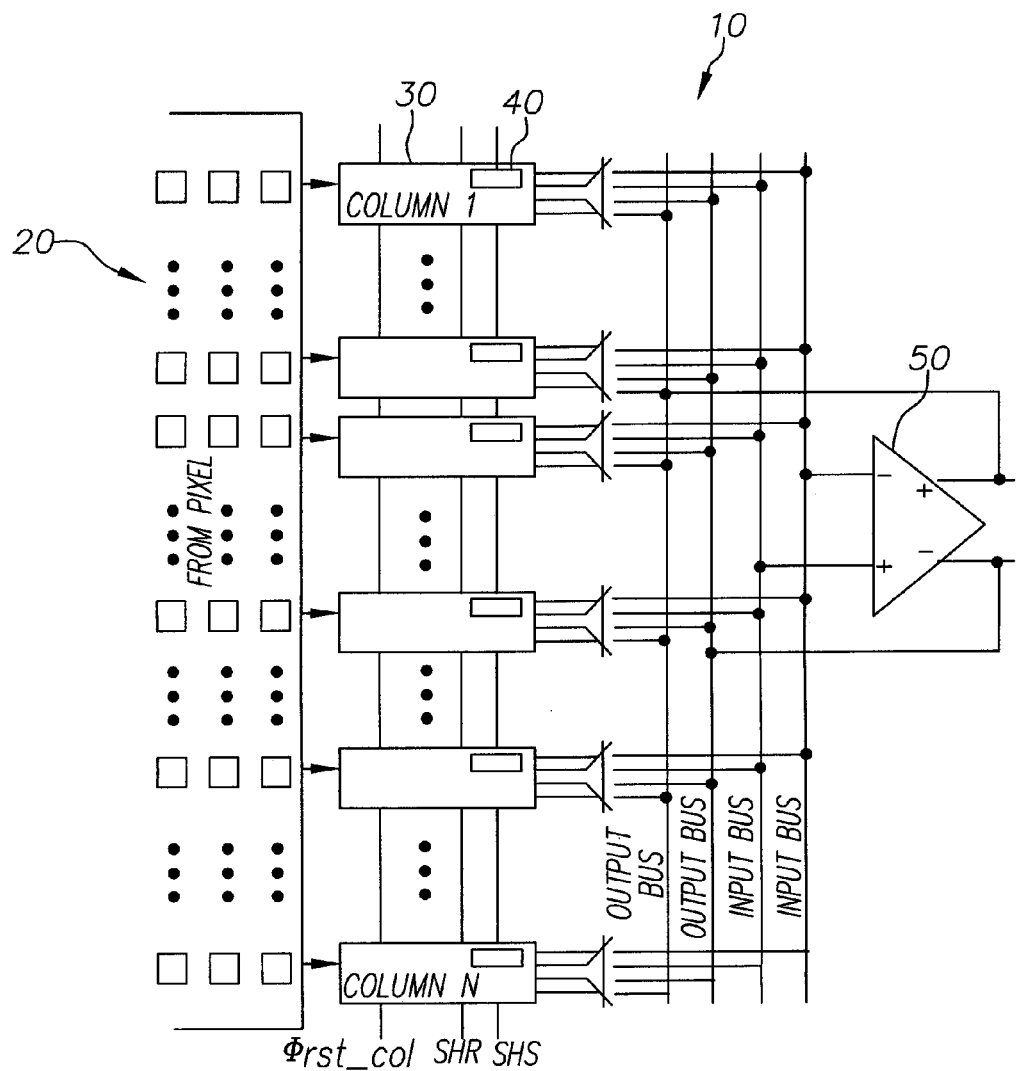
FIG. 1 is a top, view of an image sensor and its associated sample and hold circuit of the present invention.

Referring to FIG. 1, there is shown an image sensor 10 having a plurality of pixels 20 arranged in a predetermined array. A plurality of sample and hold circuits 30 is respectively connected to a row of pixels 20 of the image sensor 10 (one sample and hold circuit 30 for each column of pixels) for reading out the values sampled from the pixels 20. The sample and hold circuit 30 also includes dark reference pixels 40 as will be discussed in detail hereinbelow. An operational amplifier 50 is connected to the sample and hold circuits 30 for converting and amplifying the signals from the sample and hold circuits 30.

Figure 2:
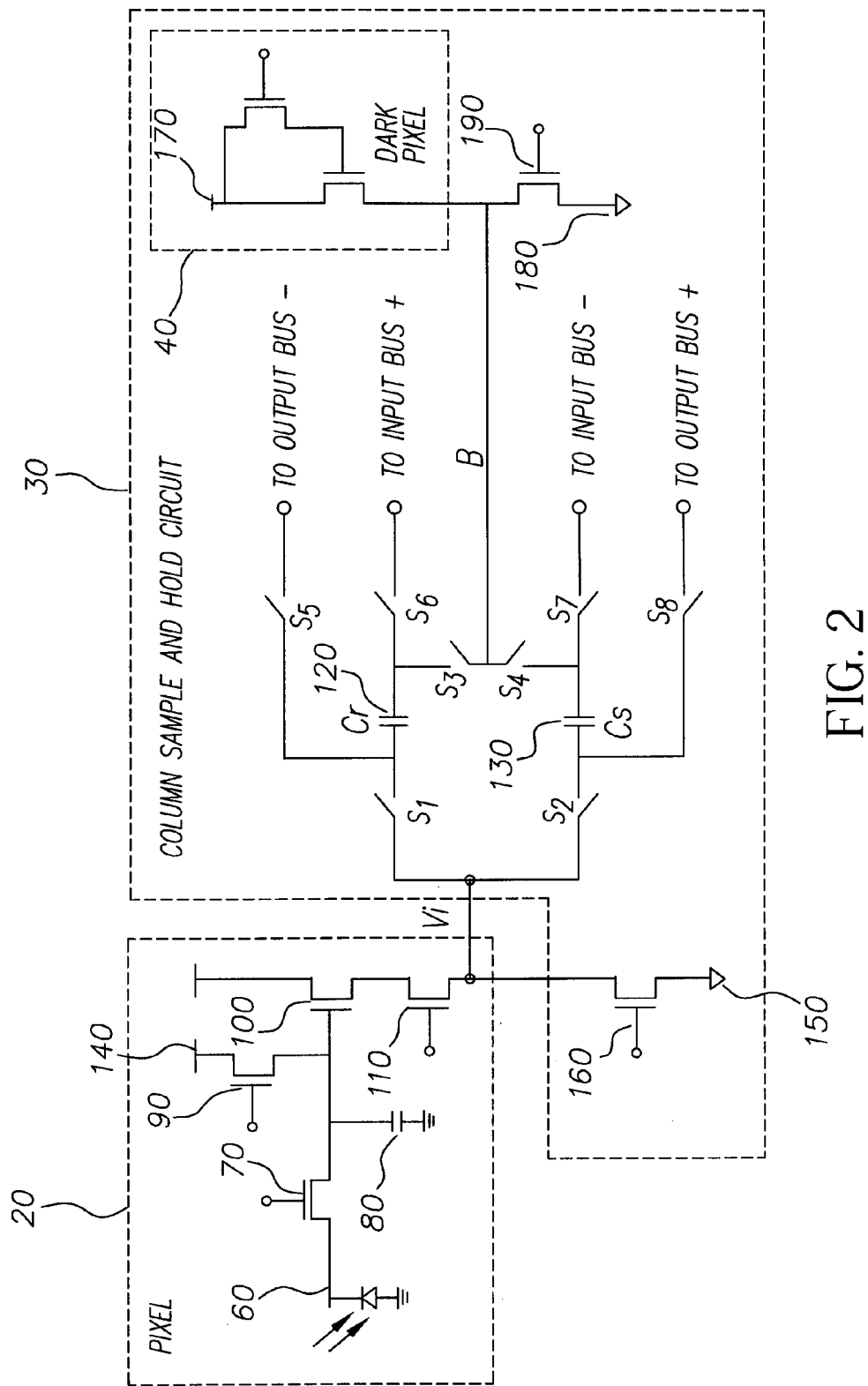
FIG. 2 is a detailed drawing of a pixel and its connections to the sample and hold circuit.

Referring to FIG. 2, there is shown a detailed drawing of a pixel 20 and its mated sample and hold circuit 30 of the present invention. Each pixel 20 includes a photosensitive area, such as photodiode 60, that receives incident light (represented by the arrows) that is converted to charge packets. A transfer gate 70 is selectively activated for transferring charge from photodiode 60 to a floating diffusion capacitor 80 that converts the charge to a voltage signal. A reset gate 90 functions to drain the charge from the floating diffusion capacitor 80 for resetting the floating diffusion capacitor 80 to a predetermined charge level. A source follower 100 transistor is connected to the floating diffusion capacitor 80 and functions to amplify the signal from the floating diffusion capacitor 80.

In order to readout both the reset signal and the actual image signal, the row select switch 110 is activated for permitting the voltage signal representing the reset level of the floating diffusion capacitor 80 to be passed to the sample and hold circuit capacitor 120. In this regard, for passing the signal to the capacitor 120, switches $S_1$ and $S_3$ are closed for charging the capacitor 120 to a level corresponding to the reset voltage level. Switches $S_1$ and $S_3$ are then opened. It is noted for clarity that the capacitors 120 and 130 store their signal as a charge as is well known in the art. The stored charge of the capacitor 120 will be readout to the operational amplifier 50 (see FIG. 1) as described hereinbelow.

It is further noted for clarity that undesirable noise is generated from the power supply 140, ground 150 and the bias voltage 160, and this undesirable noise is present at the node Vi of the row select transistor 110. As may be apparent, this noise is mixed with both the actual image signal and reset image signal. As a consequence, the present invention cancels this noise during readout as described hereinbelow.

In this regard, a dark reference pixel 40 is used to generate a reference voltage which includes the same amount of noise or substantially the same amount of noise as the noise generated from the power supply 140, ground 150 and bias voltage 160. In other words, the power supply 170, ground 180 and bias voltage 190 of the dark reference pixel 40 replicate or substantially replicate the noise of the pixel. This noise of the dark reference pixel 40 cancels the noise generated during both reset and image readout. As may be apparent, this is accomplished because the voltage on the two capacitors 120 and 130 are charged with both the voltage from the dark reference pixel and the pixel both of which contain the same or substantially the same amount of noise and are correlated in time so that the noise is canceled or substantially canceled on the capacitors 120 and 130.

In order to sample the actual image signal, switches S2 and S4 are closed for charging capacitor 130 to a level corresponding to the sensed voltage from the floating diffusion capacitor 80 that represents the sensed signal from the photodiode 60. Switches S2 and S4 are then opened. Switches S5, S6, S7 and S8 are closed for reading out the charge from the capacitors 120 and 130 respectively. It is noted that the signal on capacitor 120 represents the reset level, and the signal on capacitor 130 represents the actual signal for the image. As noted above, the noise of the power supply 140, ground 150 and bias voltage 160 that is mixed with the image signal and reset signal is canceled by the corresponding noise of the dark reference pixel 40.

An operational amplifier 50 (see FIG. 1) is connected to the outputs of the switches S5, S6, S7, and S8 for converting the sensed charges from capacitors 120 and 130 representing the rest signal and actual image signal to an amplified voltage signal.

Figure 3:
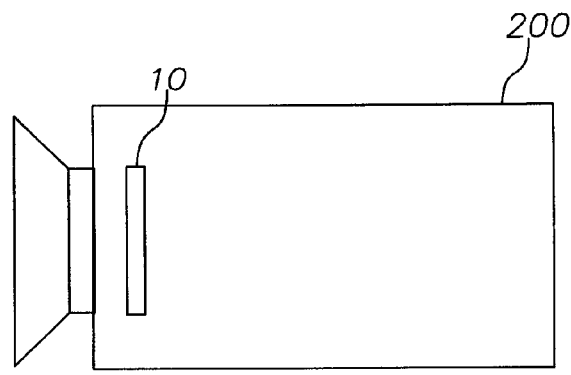
FIG. 3 is a perspective view of a camera for illustrating a typical commercial embodiment for the image sensor of the present invention.

Referring to FIG. 3, there is shown a perspective view of a camera 200 for illustrating a typical commercial embodiment for the image sensor 10 and sample and hold circuit 30 of the present invention to which the ordinary consumer is accustomed.

The invention has been described with reference to a preferred embodiment. However, it will be appreciated that a person of ordinary skill in the art can effect variations and modifications without departing from the scope of the invention.

PARTS LIST

| | |
|---|---|
| 10 | image sensor |
| 20 | pixels |
| 30 | sample and hold circuits |
| 40 | dark reference pixels |
| 50 | operational amplifier |
| 60 | photodiode |
| 70 | transfer gate |
| 80 | floating diffusion capacitor |
| 90 | reset gate |
| 100 | source follower |
| 110 | row select transistor/switch |
| 120 | sample and hold circuit capacitor |
| 130 | image signal capacitor |
| 140 | power supply |
| 150 | ground |
| 160 | bias voltage |
| 170 | power supply |
| 180 | ground |
| 190 | bias voltage |
| 200 | camera |

The invention claimed is:

1. An image sensor comprising:
   (a) a plurality of pixels arranged in rows and columns for capturing incident light that is converted to a signal representing an image;
   wherein each pixel has a first power supply and is operably connected to a first bias voltage and a first ground, and wherein the first power supply, first bias voltage, and first ground generate noise individually or in combination that is combined with a signal representing both the image and a reset level signal;
   (b) a sample and hold circuit operably connected to each column of pixels for reading out the signal representing both the image and the reset level signal; and
   (c) a dark reference pixel disposed within each sample and hold circuit for generating a reference voltage that includes the same or substantially the same amount of noise as the noise generated by the first power supply, first bias voltage, and first ground, wherein the dark reference pixel includes a second power supply and is operably connected to a second bias voltage and a second ground for generating individually or in combination the same or substantially the same amount of noise as the noise generated by the first power supply, the first bias voltage, and the first ground to cancel or substantially cancel out the noise from the image signal and reset level signal during readout of the image signal and reset level signal from the sample and hold circuit.

2. A camera comprising:
   an image sensor comprising:
   (a) a plurality of pixels arranged in rows and columns for capturing incident light that is converted to a signal representing an image;
   wherein each pixel has a first power supply and is operably connected to a first bias voltage and a first ground, and wherein the first power supply, first bias voltage, and first ground generate noise individually or in combination that is combined with a signal representing both the image and a reset level signal;
   (b) a sample and hold circuit operably connected to each column of pixels for reading out the signal representing both the image and the reset level signal; and
   (c) a dark reference pixel disposed within each sample and hold circuit for generating a reference voltage that includes the same or substantially the same amount of noise as the noise generated by the first power supply, first bias voltage, and first ground, wherein the dark reference pixel includes a second power supply and is operably connected to a second bias voltage and a second around for generating individually or in combination the same or substantially the same amount of noise as the noise generated by the first power supply, the first bias voltage, and the first ground to cancel or substantially cancel out the noise from the image signal and reset level signal during readout of the image signal and reset level signal from the sample and hold circuit.

3. A method for cancelling or substantially cancelling noise generated by a first power supply, a first bias voltage, and a first ground associated with a pixel in an image sensor, the method comprising:
   within a sample and hold circuit operably connected to the pixel, generating a reference voltage that includes the same or substantially the same amount of noise as the noise generated by the first power supply, first bias voltage, and first ground using either individually or in combination a second power supply, a second bias voltage, and a second ground associated with a dark reference pixel disposed within the sample and hold circuit; and
   cancelling or substantially cancelling the noise generated by the first power supply, the first bias voltage, and the first ground when reading out a reset signal and an image signal from the sample and hold circuit.

4. The method of claim 3, further comprising converting the read out reset signal and image signal to an amplified voltage signal.

* * * * *